(12) United States Patent
Hoertz

(10) Patent No.: US 10,713,673 B2
(45) Date of Patent: *Jul. 14, 2020

(54) INTERACTIVE MAP DISPLAYING POTENTIAL SALES TARGETS WITHIN A GEOGRAPHICAL DISTANCE TO VISITING SALES REPRESENTATIVES

(71) Applicant: ASK Chemicals LLC, Wilmington, DE (US)

(72) Inventor: Charles Conley Hoertz, Dublin, OH (US)

(73) Assignee: ASK Chemicals LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,329

(22) Filed: Nov. 19, 2019

(65) Prior Publication Data

US 2020/0082421 A1 Mar. 12, 2020

Related U.S. Application Data

(62) Division of application No. 15/475,972, filed on Mar. 31, 2017, now Pat. No. 10,540,668.

(51) Int. Cl.
*G06Q 10/02* (2012.01)
*G06Q 30/02* (2012.01)

(52) U.S. Cl.
CPC .................. *G06Q 30/0205* (2013.01)

(58) Field of Classification Search
CPC ........... G06Q 10/063114; G06Q 30/02; G06Q 30/0205; G06Q 30/0204; G06Q 30/0202
See application file for complete search history.

(56) References Cited

U.S. PATENT DOCUMENTS

| | | | |
|---|---|---|---|
| 5,032,989 A | 7/1991 | Tornetta | |
| 6,169,534 B1 * | 1/2001 | Raffel | G06Q 10/10 345/473 |
| 6,240,360 B1 | 5/2001 | Phelan | |
| 6,578,009 B1 | 6/2003 | Shinozaki | |
| 6,665,648 B2 * | 12/2003 | Brodersen | G05B 19/042 705/7.11 |
| 6,850,895 B2 | 2/2005 | Brodersen et al. | |
| 6,963,826 B2 | 11/2005 | Hanaman et al. | |
| 6,975,999 B2 | 12/2005 | Moore | |
| 7,174,301 B2 | 2/2007 | Florance et al. | |

(Continued)

OTHER PUBLICATIONS

Baker, Jared, App of the Week—Get feedback on meetings with Simple Visit Reports in Salesfoce CloudMyBiz.com, Jan. 31, 2014 (Year: 2014).*

(Continued)

*Primary Examiner* — Scott L Jarrett
(74) *Attorney, Agent, or Firm* — Standley Law Group LLP; Jeffrey S. Standley; James L. Kwak

(57) ABSTRACT

Systems and methods for facilitating effective sales are provided. A database contains location and potential revenue data for a plurality of sales targets. A graphical user interface ("GUI") is generated at an electronic display for a mobile device. The GUI includes a map with selectable icons representing sales targets, displayed at their respective locations, within a distance of the location of the mobile device.

16 Claims, 19 Drawing Sheets
(12 of 19 Drawing Sheet(s) Filed in Color)

(56) References Cited

U.S. PATENT DOCUMENTS

| | | | |
|---|---|---|---|
| 7,308,704 | B2 | 12/2007 | Vogel et al. |
| 7,340,410 | B1 | 3/2008 | Vaillancourt et al. |
| 7,447,700 | B1 | 11/2008 | Behera et al. |
| 7,620,564 | B1* | 11/2009 | Lippock .............. G06Q 30/0201 |
| | | | 705/7.29 |
| 7,664,668 | B2* | 2/2010 | Lissy .................... G06Q 10/06 |
| | | | 705/7.13 |
| 7,974,865 | B2 | 7/2011 | Patnaik et al. |
| 8,015,038 | B2 | 9/2011 | Gennaro et al. |
| 8,315,791 | B2 | 11/2012 | Bales et al. |
| 8,510,659 | B2 | 8/2013 | Lam et al. |
| 8,626,572 | B2 | 1/2014 | Colliat et al. |
| 8,799,796 | B2 | 8/2014 | Ehrler et al. |
| 8,812,345 | B2 | 8/2014 | Cragun et al. |
| 9,230,351 | B2 | 1/2016 | Dodgen et al. |
| 9,400,958 | B2 | 7/2016 | B'Far et al. |
| 9,420,100 | B2* | 8/2016 | Bellini ................ G06Q 10/063 |
| 9,626,637 | B2 | 4/2017 | Winters |
| 9,760,237 | B2 | 9/2017 | Eraker et al. |
| 9,886,695 | B2* | 2/2018 | Kotak ................. G06Q 30/0202 |
| 10,108,974 | B1 | 10/2018 | Shariff et al. |
| 10,140,743 | B2 | 11/2018 | Hochmuth et al. |
| 10,262,327 | B1* | 4/2019 | Hardebeck ............ G06Q 30/02 |
| 10,521,744 | B2* | 12/2019 | Kyle, Jr. ........... G06Q 10/06311 |
| 10,540,668 | B2* | 1/2020 | Hoertz ............... G06Q 30/0205 |
| 2001/0033284 | A1 | 10/2001 | Chan |
| 2002/0082892 | A1* | 6/2002 | Raffel ............. G06Q 10/06311 |
| | | | 705/7.26 |
| 2004/0138944 | A1 | 7/2004 | Whitacre et al. |
| 2004/0139102 | A1 | 7/2004 | Vierich et al. |
| 2004/0225955 | A1* | 11/2004 | Ly .......................... G06Q 10/06 |
| 2005/0102284 | A1 | 5/2005 | Srinivasan et al. |
| 2005/0131710 | A1 | 6/2005 | Sahagian |
| 2005/0222886 | A1* | 10/2005 | Sridharan ............ G06Q 10/109 |
| | | | 705/7.13 |
| 2005/0231392 | A1 | 10/2005 | Meehan et al. |
| 2005/0278286 | A1 | 12/2005 | Djugash et al. |
| 2006/0112123 | A1* | 5/2006 | Clark ..................... G06F 40/18 |
| 2006/0167704 | A1 | 7/2006 | Nicholls et al. |
| 2006/0200383 | A1 | 9/2006 | Artunian et al. |
| 2006/0293930 | A1* | 12/2006 | Rodgers ................. G06Q 10/02 |
| | | | 705/5 |
| 2007/0015518 | A1* | 1/2007 | Winter .................... G08G 1/205 |
| | | | 455/456.1 |
| 2007/0043609 | A1 | 2/2007 | Imam et al. |
| 2008/0034314 | A1 | 2/2008 | Louch et al. |
| 2008/0082386 | A1* | 4/2008 | Cunningham ......... G06Q 10/06 |
| | | | 705/7.33 |
| 2008/0086359 | A1* | 4/2008 | Holton ............... G06Q 30/0201 |
| | | | 705/7.29 |
| 2008/0195930 | A1 | 8/2008 | Tolle |
| 2008/0312987 | A1 | 12/2008 | Damodaran et al. |
| 2009/0319931 | A1 | 12/2009 | Hutchings et al. |
| 2010/0228752 | A1 | 9/2010 | Folting et al. |
| 2011/0205231 | A1 | 8/2011 | Hartley et al. |
| 2011/0208562 | A1 | 8/2011 | Hartley et al. |
| 2011/0225525 | A1 | 9/2011 | Chasman et al. |
| 2011/0283231 | A1 | 11/2011 | Richstein et al. |
| 2012/0297327 | A1 | 11/2012 | Chow et al. |
| 2013/0013589 | A1* | 1/2013 | Stevenson ............. G06Q 30/02 |
| | | | 707/722 |
| 2013/0111321 | A1 | 5/2013 | Dorrell |
| 2013/0179225 | A1 | 7/2013 | Nadiadi et al. |
| 2013/0275329 | A1* | 10/2013 | Starr ..................... G06Q 10/00 |
| | | | 705/345 |
| 2013/0339291 | A1 | 12/2013 | Hasner |
| 2014/0033120 | A1 | 1/2014 | Bental et al. |
| 2014/0046711 | A1* | 2/2014 | Borodow ....... G06Q 10/063114 |
| | | | 705/7.15 |
| 2014/0081903 | A1 | 3/2014 | Koosel et al. |
| 2014/0149836 | A1 | 5/2014 | Bedard et al. |
| 2014/0164038 | A1 | 6/2014 | Maughan |
| 2014/0208215 | A1 | 7/2014 | Deshpande |
| 2015/0012278 | A1* | 1/2015 | Metcalf .................... G10L 15/22 |
| | | | 704/270.1 |
| 2015/0088610 | A1* | 3/2015 | Bayles ............... G06Q 30/0205 |
| | | | 705/7.34 |
| 2015/0120444 | A1* | 4/2015 | Deshpande ........ G06Q 30/0267 |
| | | | 705/14.53 |
| 2015/0287119 | A1 | 10/2015 | Bhan et al. |
| 2015/0310466 | A1 | 10/2015 | LaCivita et al. |
| 2015/0371158 | A1* | 12/2015 | Oberweis ............. G06Q 10/067 |
| | | | 705/348 |
| 2016/0103592 | A1 | 4/2016 | Prophete et al. |
| 2016/0104176 | A1* | 4/2016 | Kama ................. G06Q 30/0202 |
| | | | 705/7.31 |
| 2016/0212266 | A1* | 7/2016 | Soundar .............. H04M 3/5235 |
| 2017/0046649 | A1* | 2/2017 | Kyle, Jr. ........... G06Q 10/06311 |
| 2017/0069118 | A1 | 3/2017 | Stewart |
| 2017/0083589 | A1 | 3/2017 | Prominville et al. |
| 2017/0286449 | A1 | 10/2017 | Strube et al. |
| 2018/0130152 | A1 | 5/2018 | Holbrook et al. |

OTHER PUBLICATIONS

Create Visit Records and Track Number of Visits Support.formyoula.com, Dec. 13, 2015 (Year: 2015).*
Track and Follow your Latest Sales Progress—Sales Activity Tracker Kapturecrm.com/gps-tracking, May 11, 2017 (Year: 2017).*
SalesCRM—KaptureCRM Kapturecrm.com, Nov. 26, 2016 (Year: 2016).*
Monitoring Sales Force ActitudPro.com, Jul. 10, 2015 (Year: 2015).*
Persistent Systems Helps VisitOps Launch New Customer Visit Management App on Salesforce AppExchange Persistent Systems, May 20, 2015 (Year: 2015).*
Getting Started With VisitEye Visiteye.com, VisitBasis LLC, 2016 (Year: 2016).*
Easily Track Field Teams in Real Time VisitEye Product Data Sheet, 2016 (Year: 2016).*
VisitEye Tutorial for Admins VisitEye.com, 2016 (Year; 2016).*
VisitOps.com, Retrieved from Archive.org, Dec. 18, 2014 (Year: 2014).*
Tableau on Tableau: 5 Ways We Look at Our Sales Data Tableau.com, Sep. 12, 2015 (Year: 2015).*
Tableau Visual Guidebook Tableau Software, 2010 (Year: 2010).*
AlignStar—Professional Territorial Design Software, Datasourtech.com, 2003.
Cravens, David W., An Analytical Approach for Evaluating Sales Territory Performance, Journal of Marketing, Jan. 1972, vol. 36.
Channin, Jason, ArcGIS Business Analyst—An Introduction ESRI, Sep. 2007.
Cognos 8 Business Intelligence—Report Studio—User Guide Cognos, 2006.
Ergometrics.com Web Pages, Ergometrics.com, Mar. 2000, Retrieved from Archive.org.
Miller, Fred, GIS Tutorial for Marketing—Chapter 9—Managing Sales Territories ESRI Press, 2007.
ZS Associates—MAPS Territory Alignment, www.zassociates.com, 2002, Retrieved from Archive.org.
Oracle Sales Analytics—Data Sheet Oracle, 2011.
Oracle Business Intelligance Publisher—Report Designer's Guide Oracle, Aug. 2008.
Oracle Territory Management, User Guide Oracle, Apr. 2003.
Prabhankant, Sinha et al., Sales-force decision models: Insights from 25 years of implementation Interfaces, May/Jun. 2001, vol. 31, No. 3.
Li, Miranda, Tableau on Tableau: 5 Ways We Look at Our Sales Data, Tableau.com, Sep. 9, 2015.
Tell a story with your map-enabled BI dashboard ArcGIS Blog, Mar. 31, 2015.
Territory Design, ESRI, Dec. 2010.
Charles, Erik W. et al., Track Sales Performance, ACA News, vol. 43, No. 3, Mar. 2000.

* cited by examiner

Sales Tracker Dash Board

Schedule View | Visits Summary | Sales vs. Visits | Export Data

<< Week 7
(February 12 - 18)

| Monday | Tuesday | Wednesday | Thursday | Friday |

By Foundry
By Commercial Rep.
Select All

Visits

Search

| Foundry | Rep Name | Visit Date | Time IN | Time OUT | Total Time |
|---|---|---|---|---|---|
| Company 123 | Sales Assoc. 2 | 02-14-2017 | 07:07 AM | | |
| Company 123 | Sales Assoc. 3 | 02-14-2017 | 07:08 AM | | |
| Company 534 | Sales Assoc. 4 | 02-14-2017 | 09:51 AM | 10:17 AM | 0:26:0 |
| Company 456 | Sales Assoc. 5 | 02-14-2017 | 07:02 AM | | |
| Company 789 | Sales Assoc. 4 | 02-14-2017 | 09:51 AM | | |

| | Visits |
|---|---|
| Company 123 | 2 |
| Company 456 | 1 |
| Company 789 | 1 |
| Company 534 | 1 |

FIG. 13

Sales Tracker Dash Board

| | Annual | QRT | Month | Week | Export Data |
|---|---|---|---|---|---|

| Rep Name | Visit Date | Time IN | Time OUT | Total Time |
|---|---|---|---|---|
| Sales Associate 7 | 01-06-2017 | 11:13 AM | 01:45 PM | 2:32:0 |
| Sales Associate 7 | 01-06-2017 | 02:21 PM | 03:43 PM | 1:22:0 |
| Sales Associate 7 | 01-17-2017 | 09:45 AM | 02:26 PM | 4:41:0 |
| Sales Associate 8 | 01-23-2017 | 09:28 PM | 11:27 PM | 1:59:0 |
| Sales Associate 8 | 01-24-2017 | 08:57 AM | 12:13 PM | 3:16:0 |

| Annual Sales | $ 396 62 | Annual Potential | $ 1,195,402.25 64 | Visit Total | 5 Visits |
|---|---|---|---|---|---|

Main View — Visit Details

Schedule View | Sales vs. Visits

By Foundry — Visits

Search
- XYZ Co. — 6
- Foundry X — 5
- EFG Metal Co. — 5
- Foundry B — 5
- Foundry C — 5
- Foundry D — 5
- Foundry E — 4
- Foundry A — 
- Foundry G — 4

INTERACTIVE MAP DISPLAYING POTENTIAL SALES TARGETS WITHIN A GEOGRAPHICAL DISTANCE TO VISITING SALES REPRESENTATIVES

CROSS-REFERENCE TO RELATED APPLICATIONS

This application is a divisional of U.S. application Ser. No. 15/475,972 filed Mar. 31, 2017, the disclosures of which are hereby incorporated by reference as if fully restated.

BACKGROUND OF THE INVENTIVE FIELD

The present invention is directed to a system and method for facilitating the identification of potential sales targets by tracking and providing sales target and sales data in an interactive, unified, graphical and coded fashion. Currently there is no system or solution for sales associates traveling in the field to identify sales targets, and their sales potential, easily, interactively, graphically, and in a unified manner. For example, the specific structure and layout of the graphical user interface provides new functionality to the user and aids the user in quickly and efficiently:

providing a graphical and unified map view of potential sales targets coded by icon shape and color, where the color of the icon is determined by the sales potential of the sales target.

filtering and customizing the graphical and unified map view of the sales targets by numerous factors (e.g., for example for foundry sales targets filtering and displaying sales targets by sales representative(s), sales territory(s), state/region(s), business line(s), sales potential, industry/sector(s), metal type(s), molding process, core making process). For example, displaying a list of sales associates, each name adapted to be selected by the user, and in response to being selected by the user, filtering the sales target data and displaying only those sales targets associated with the selected sales associate(s).

providing a selectable icon with a company logo that when selected customizes the graphical view by changing the icon shape to a company logo for each sales target that is a customer of the company;

customizing the graphical view by using a color-coded toggle tool for assigning different colors to different sales associates.

providing a "dashboard" feature that provides a unified view of specific sales target data in a graphical fashion including graphical bar graphs of estimated sales for each sales target versus full potential sales for each sales target, and actual sales for each sales target versus potential sales for each target (broken down by a predetermined time period and by product lines). This dashboard functionality appears over only a portion of the graphical map of the sales region and the system is adapted to change the contents of the dashboard based on the specific sales target selected on the graphical map. In this fashion, the user sees a graphical, color-coded and unified view of relevant sales targets and relevant sales data for selected targets.

providing a selectable circle graph with three concentric lines, one line showing the actual sales for the selected sales target, one line showing estimated sales for the selected sales target, and the third line showing potential sales for the selected sales target, where each line is illustrated in a different color from the other lines.

providing a pop-up window reached from selecting the selectable circle graph, the window appearing partially above the dashboard and graphical map, that provides a graphical view of actual sales for the selected sales target, the estimated sales for the selected target and potential sales for the selected target in one unified view broken down by product line. The system is also adapted so that each product line is selectable by the user so that when selected, sales information for specific products is provided.

providing a reporting functionality accessible from the dashboard interface for allowing users to report new sales data relating to the specific target that is currently being displayed on the dashboard.

dynamically providing the data provided in the graphical map and dashboard ("dynamically" meaning that once new data is supplied (e.g. a user modifies the potential within reporting center)). The data is automatically applied within the map and dashboard. For example, the color of the sales target icon will change automatically based on the sales potential reported by the user.

Furthermore, currently there is no system or solution to effectively track sales target visits by sales associates traveling in the field or to track and determine sales effectiveness by associating sales visits to sales data. The system of the present invention provides a solution to this problem by providing an interactive and graphical view of sales visit information broken down by date or sales territory. The system also allows the user to filter the sales visit information by sales target(s) or sales associate(s). For example, the specific structure and layout of the graphical user interface provides new functionality to the user and aids the user in quickly and efficiently:

tracking sales visits, preferably by satellite global positioning systems (GPS) in the mobile devices of the sales associates.

providing a graphical view of the sales visits filterable by foundry(s) and/or sales associate(s).

providing a graphical view of sales effectiveness by providing a graph showing sales data for sales targets, the system adapted to draw a line on the graph indicating the number of visits to each sales target. In one embodiment, the sales data shown graphically can be in the form of a bar broken down by actual sales versus potential sales and where the graph can be customized to show this information over a predetermined period (annual, quarterly, monthly, weekly).

SUMMARY OF THE GENERAL INVENTIVE CONCEPT

In one embodiment of the invention, the invention is comprised of: a graphical user interface having an image of a sales region for displaying on a screen; a processing system, the processing system programmed with instructions for executing on the processing system for: displaying on the sales region, a plurality of selectable icons representing the location of potential sales targets; dynamically displaying a first subset of the plurality of selectable icons in a first color, the first color representing sales potential in a first predetermined monetary range; dynamically displaying a second subset of the plurality of selectable icons in a second color, the second color representing sales potential in a second predetermined monetary range, the second predetermined monetary range being lower than the first predetermined monetary range; in response to a selection of a particular one of the plurality of selectable icons, displaying in a first location on the screen a first window; displaying in the first window a summary data region providing information relating to the sales target associated with the selected particular icon; displaying in the first window a sales data region; dynamically displaying in the sales data region sales data relating to the sales target associated with the selected particular icon.

The foregoing and other features and advantages of the present invention will be apparent from the following more detailed description of the particular embodiments, as illustrated in the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In addition to the features mentioned above, other aspects of the present invention will be readily apparent from the following descriptions of the drawings and exemplary embodiments, wherein like reference numerals across the several views refer to identical or equivalent features, and wherein:

FIG. 13 illustrates one embodiment of the graphical user interface of FIG. 12 showing a listing of sales visits based on sales targets;

FIG. 18 illustrates one embodiment of the graphical user interface of FIG. 12 showing sales versus visits for a selected sales target;

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
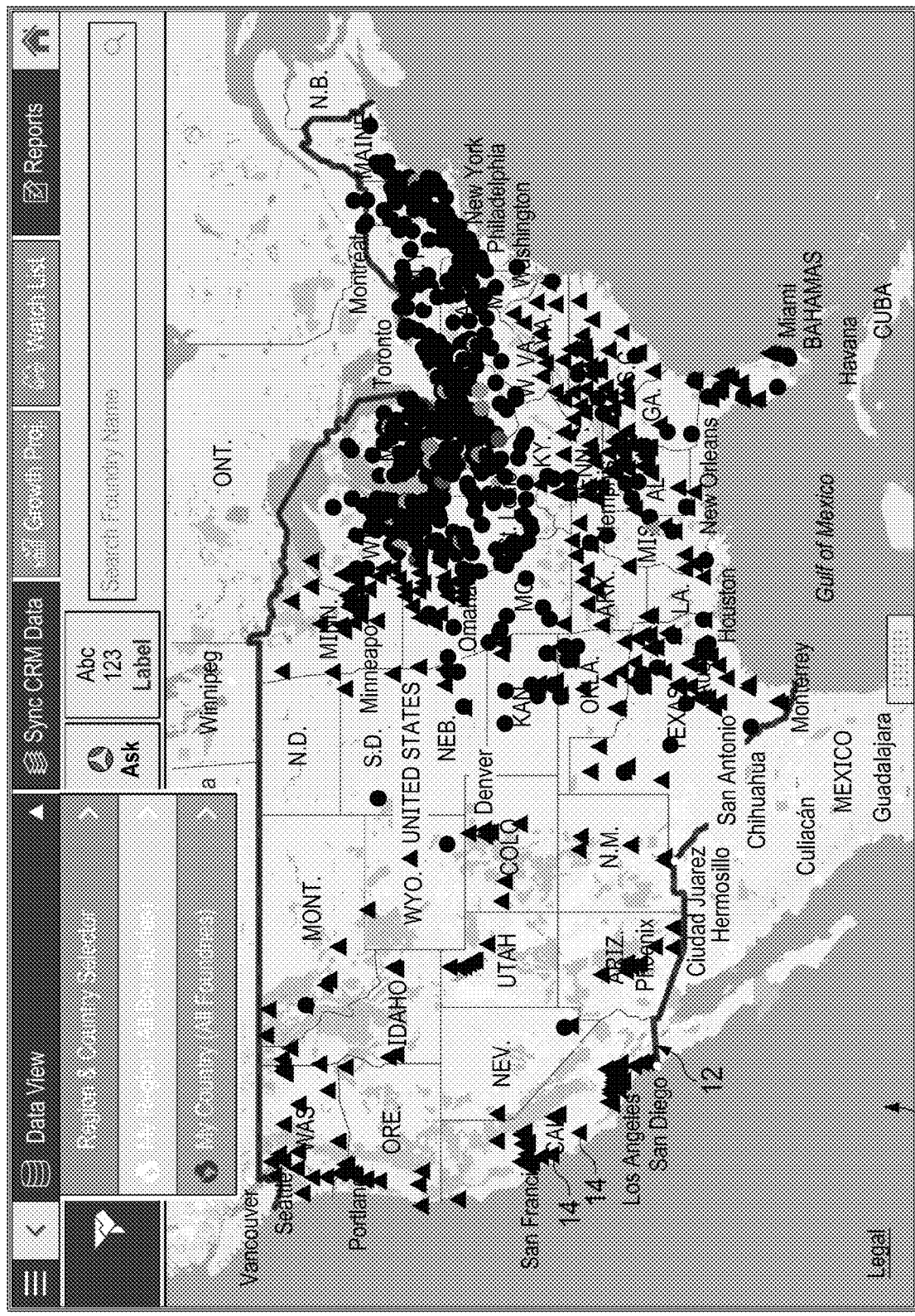
FIG. 1 illustrates one embodiment of a graphical user interface of the present invention showing an image of a sales region and sales target locations.

FIG. 1 illustrates one embodiment of a graphical user interface 10 of the present invention showing an image of a sales region 12 and sales target locations 14. In this embodiment, the sales targets are foundry locations shown by triangles or circles. The triangles represent foundry locations that are distributor-based sales targets (e.g., the company goes through a distributor to make sales to these targets). The circles represent foundry locations that are non-distributor based (e.g., the company sells directly to these sales targets). In the preferred embodiment, the sales targets are represented by selectable icons. The sales target icons are displayed on the map according to their respective geographic location.

In this embodiment, the system dynamically displays a first subset of the plurality of selectable icons in a first color, the first color representing sales potential in a first predetermined monetary range. For example, the first color may be green indicating those sales targets in green color have the highest sales potential (e.g., above $1,000,000). The system also dynamically displays a second subset of the plurality of selectable icons in a second color, the second color representing sales potential in a second predetermined monetary range (e.g., $500,000-$999,999), the second predetermined monetary range being lower than the first predetermined monetary range. It is appreciated that the system can be programmed to code the sales target icons based on various different monetary ranges representing sales potential of the sales targets. For example, a third color can be used to indicated sales targets with sales potentials between $100,000-$499,999. A fourth color can be used to indicate sales targets with sales potentials between $50,000-$99,999. A fifth color can be used to indicate sales targets with sales potential between $0-$49,999, etc.

The graphical user interface provides a unified view of potential sales targets that provides a sales associate traveling on the road with an easy to use, interactive, graphical interface that quickly shows sales target information through coded shapes and colors. The structure of the interface allows the sales associate to quickly identify potential sales targets, to quickly differentiate sales targets, and to determine quickly which targets have the most sales potential. The interface of the present invention also provides the ability to select each of the sales target icons to access more detailed information about each of the sales targets. The more detailed information is also provided according to a specifically structured interface as described below. As illustrated in FIG. 1, a particular sales associate may filter the view by the entire region or the sales country assigned to the sales associate.

Figure 2:
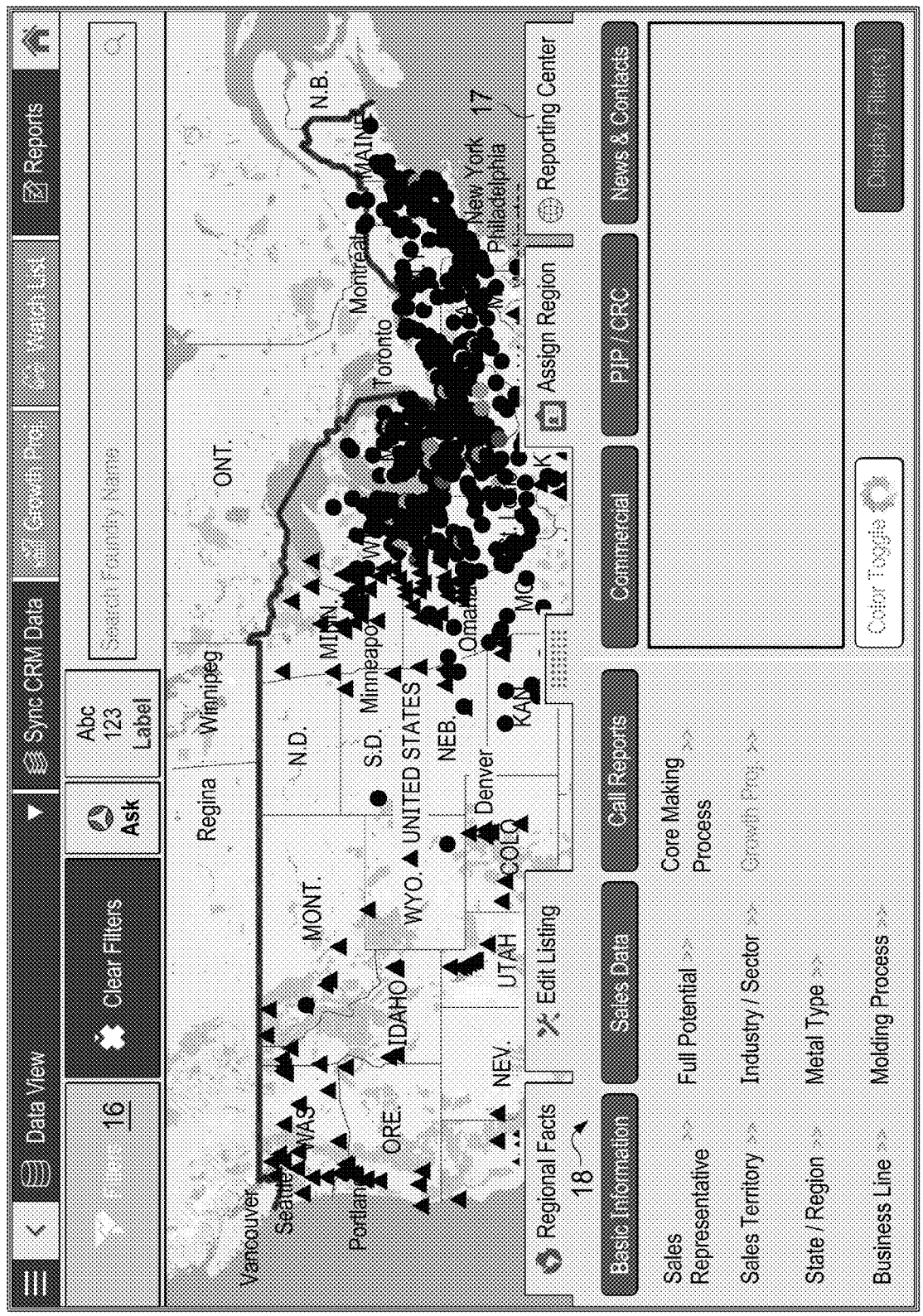
FIG. 2 illustrates one embodiment of a filter window of the present invention.

FIG. 2 illustrates one embodiment of the filter window of the present invention. In response to clicking on the "filter" icon 16, a filter window 18 pops up with a list of various filter factors such as sales representatives, sales potential, sales territory, state/region, industry served, metal type, product line, core making process and molding process. In response to selecting one of the plurality of selectable filter factors, the system is adapted to display, on the sales region, only those sales targets related to the selected filter factor. For example, the user can filter the display of sales targets to show only those targets within a particular range of sales potential. As another example, the user can filter the display of sales targets to show only those targets that use a certain type of molding process. Filtering in this manner assists the sales associate, for example, in determining which products the sales targets may be interested in (as certain molding processes use certain materials).

In response to selecting the sales potential filter factor, the system is adapted to display a plurality of selectable monetary ranges representing ranges of sales potential. In response to selecting a particular monetary range, the system is adapted to display on the sales region, only those sales targets with sales potential in the selected monetary range. For example, the system displays at least a first selectable range of sales potential (e.g., $1,000,000 and above) and a second selectable range of sales potential (e.g., $500,000 to $999,999). In response to selecting the first range of sales potential, the system will display, on the sales region of the graphical interface, only those sales targets that have a sales potential above $1,000,000.

The system preferably has a selectable reporting icon 17. In response to selecting the reporting icon, the system is adapted to display on the screen a reporting window having a plurality of locations for entering information about the selected sales target. Information entered or reported via these locations are stored in the system and the information is dynamically displayed on the image of the sales region and other locations of the graphical user interface as described below.

Figure 3:
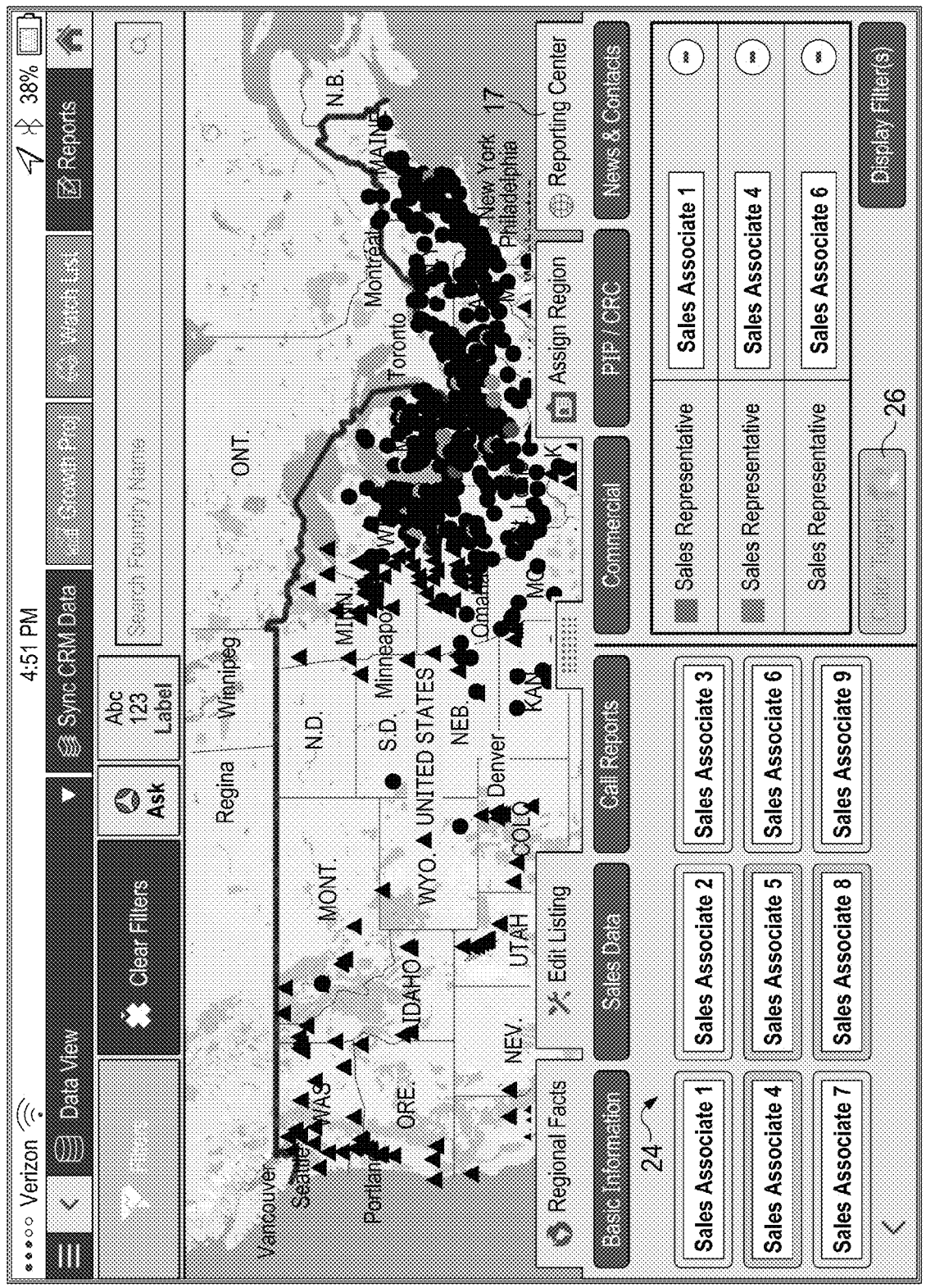
FIG. 3 illustrates one embodiment of a filter window for filtering based on sales associate(s)

FIG. 3 illustrates one embodiment of a filter window for filtering based on sales associate(s). In response to selecting the sales representative filter factor, the system is adapted to display a window 24 with a list of company sales associates/employees (for the purpose of this description, specific names of sales associates have not been used although that is the preferred embodiment—sales associates are herein referred to by an associate number). The user can select one sales associate or a plurality of sales associates from the list. For example, in response to selecting the selectable name of a sales associate, the system is adapted to display, on the sales region, only those potential sales targets that are assigned to the selected sales associate.

In one embodiment, the system is adapted to provide a color toggle feature 26 that assigns different colors to different sales associates. The system is adapted to display the sale target icons on the sales region screen in their assigned colors so that the user can easily ascertain from a quick glance the sales targets assigned to each selected sales associate. For example, if the user selects the name of a first sales associate and the name of a second sales associate from the list of sales associates, the system will filter the information and display, in a first color, all the sales targets associated with the first sales associate, and display, in a second color, all the sales targets associated with the second sales associate.

Figure 4:
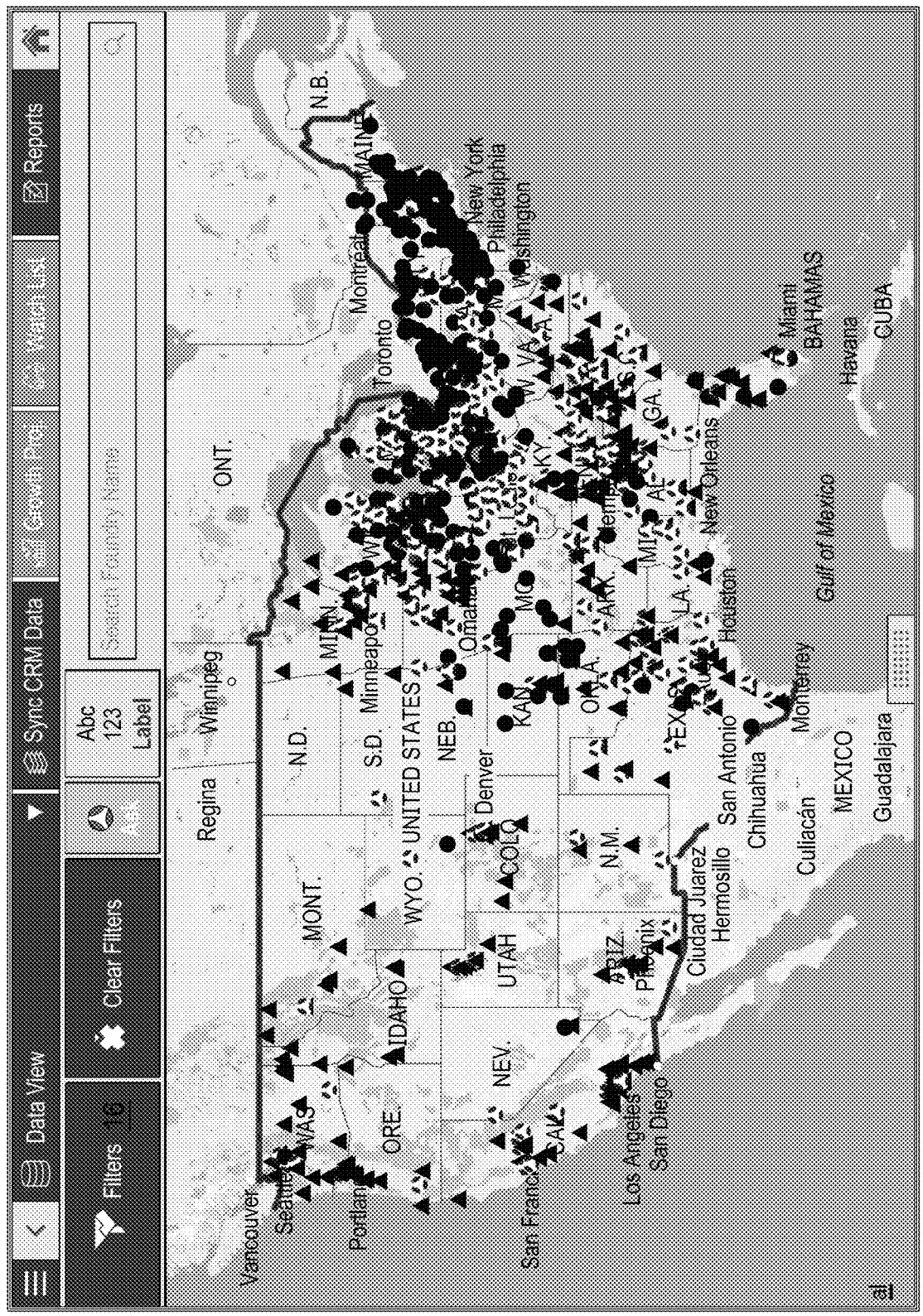
FIG. 4 illustrates one embodiment of the graphical user interface of the present invention showing customization to show existing customers or company sales targets.

FIG. 4 illustrates one embodiment of the graphical user interface of the present invention showing customization to show existing customers or company sales targets. For example, selecting the ASK company logo on the screen instructs the system to display all of the sales targets that are existing customers of the company. Specifically, the system changes sales target icons to the shape of the company logo for those sales targets that are already customers of the company.

Figure 5:
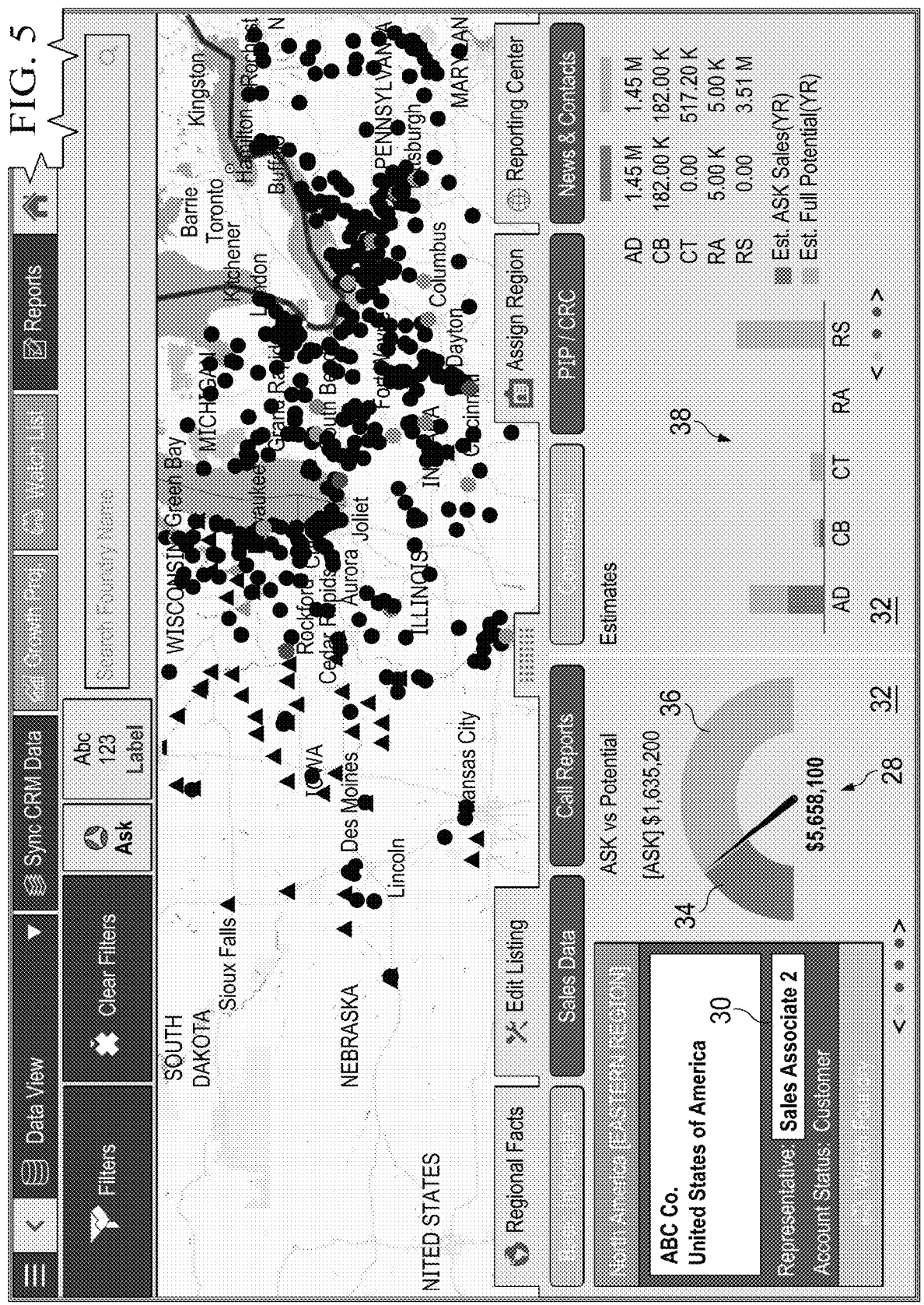
FIG. 5 illustrates one embodiment of a first window shown in response to selecting one of the sales target icons.

FIG. 5 illustrates one embodiment of a first window 28 shown in response to selecting one of the sales targets (represented by a selectable icon) on the sales region screen. The system is adapted to display in the first window a summary data region 30 providing information relating to the sales target associated with the selected particular icon. (In this example, ABC Co. is the selected sales target). The system is also adapted to display in the first window a sales data region 32 for dynamically displaying a first bar graph having a first bar portion 34 representing actual or estimated sales of the sales target associated with the selected sales target and a second bar portion 36 representing potential sales of the sales target associated with the selected icon. In the present application, "dynamically displaying" means to display the information automatically as the data it represents changes (in this embodiment, there is a short time lag between the time the data is changed to the time the data is displayed).

The system is also adapted to display in a second region in the first window a plurality of bar graphs 38, each of the plurality of bar graphs having first bar portion dynamically representing actual or estimated sales of a particular product line of a selected sales target and a second bar portion dynamically representing potential sales of the particular product line of the selected sales target. For the embodiment of FIG. 5, where the sales targets are foundries, the product lines are: release agents (RA), metallurgy (MT), cold box/epoxy (CB), inorganics (IN), additives (AD), risers and sleeves (RS), coatings (CT), no bake/hot box (NB), and filters (FT).

Figure 6:
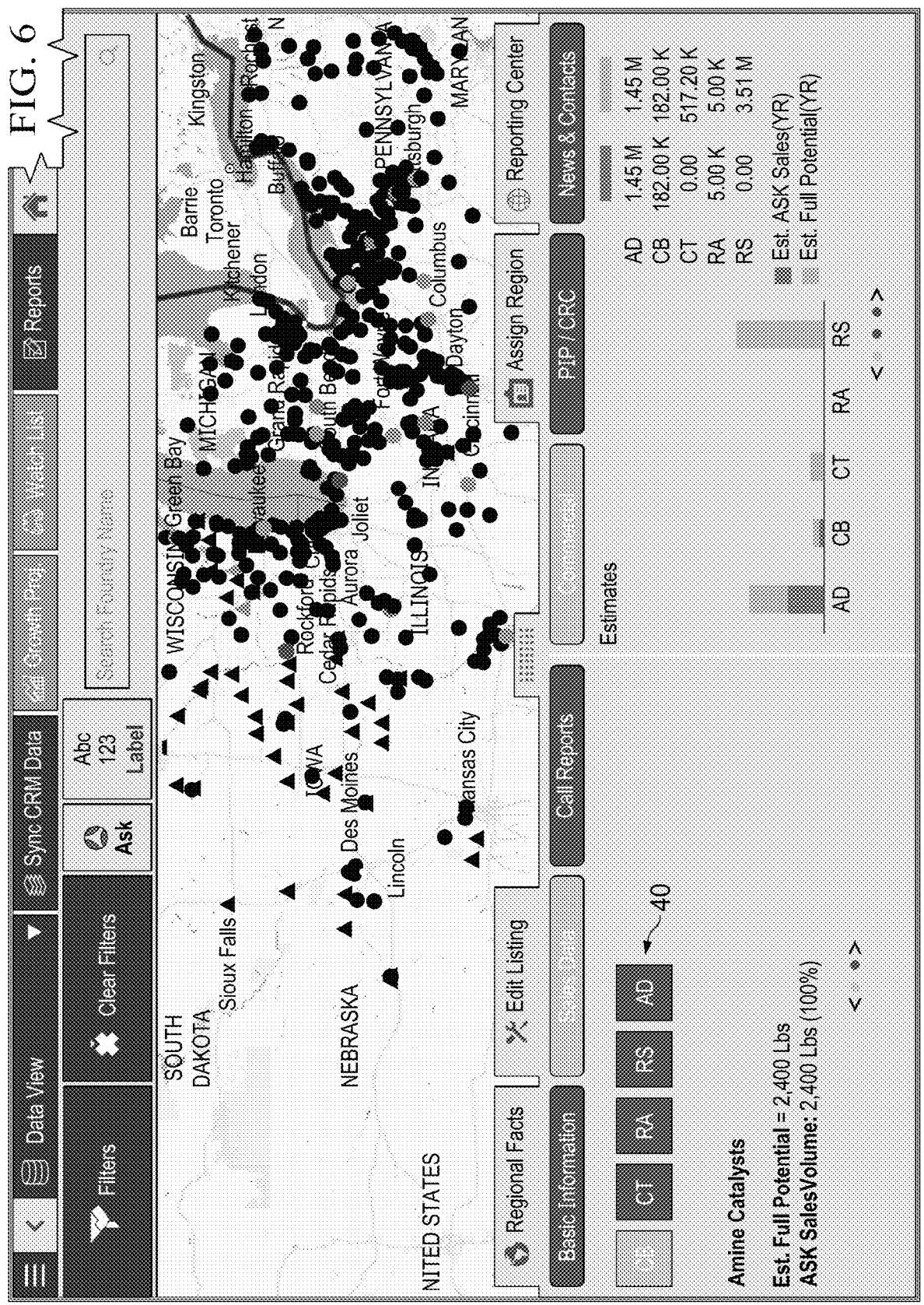
FIG. 6 illustrates one embodiment of the first window showing sales information for a selected sales target broken down by product line.

FIG. 6 illustrates one embodiment of the first window showing sales information for a selected sales target broken down by product line. The user can select other boxes 40 representing different product lines to view detailed sales information for the selected product line.

Figure 7:
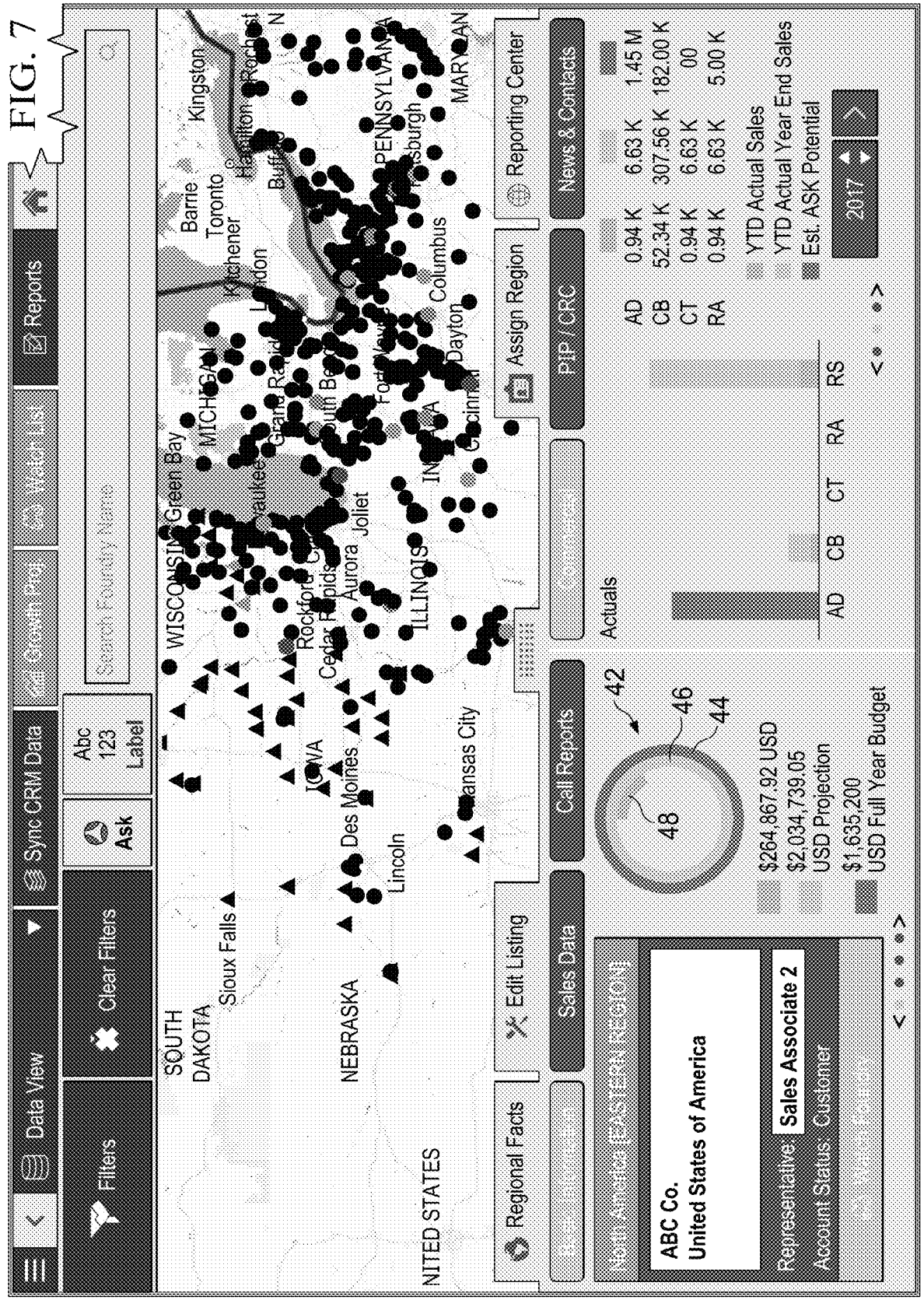
FIG. 7 illustrates one embodiment of the first window showing sales data of the selected sales target in graphical form.

FIG. 7 illustrates one embodiment of the first window showing sales data of the selected sales target in graphical form. As shown, sales data is depicted as a bar graph in a circular shape 42 and where the first bar portion 44 is concentric with second and third bar portions 46, 48 and wherein the first, second and third bar portions are all displayed in different colors. In this embodiment, the first bar portion (first color, e.g., blue) represents potential annual sales, the second bar portion (second color, e.g., yellow) represents estimated annual sales and the third bar portion (third color, e.g., green) represents actual year-to-date (ytd) sales.

Figure 8:
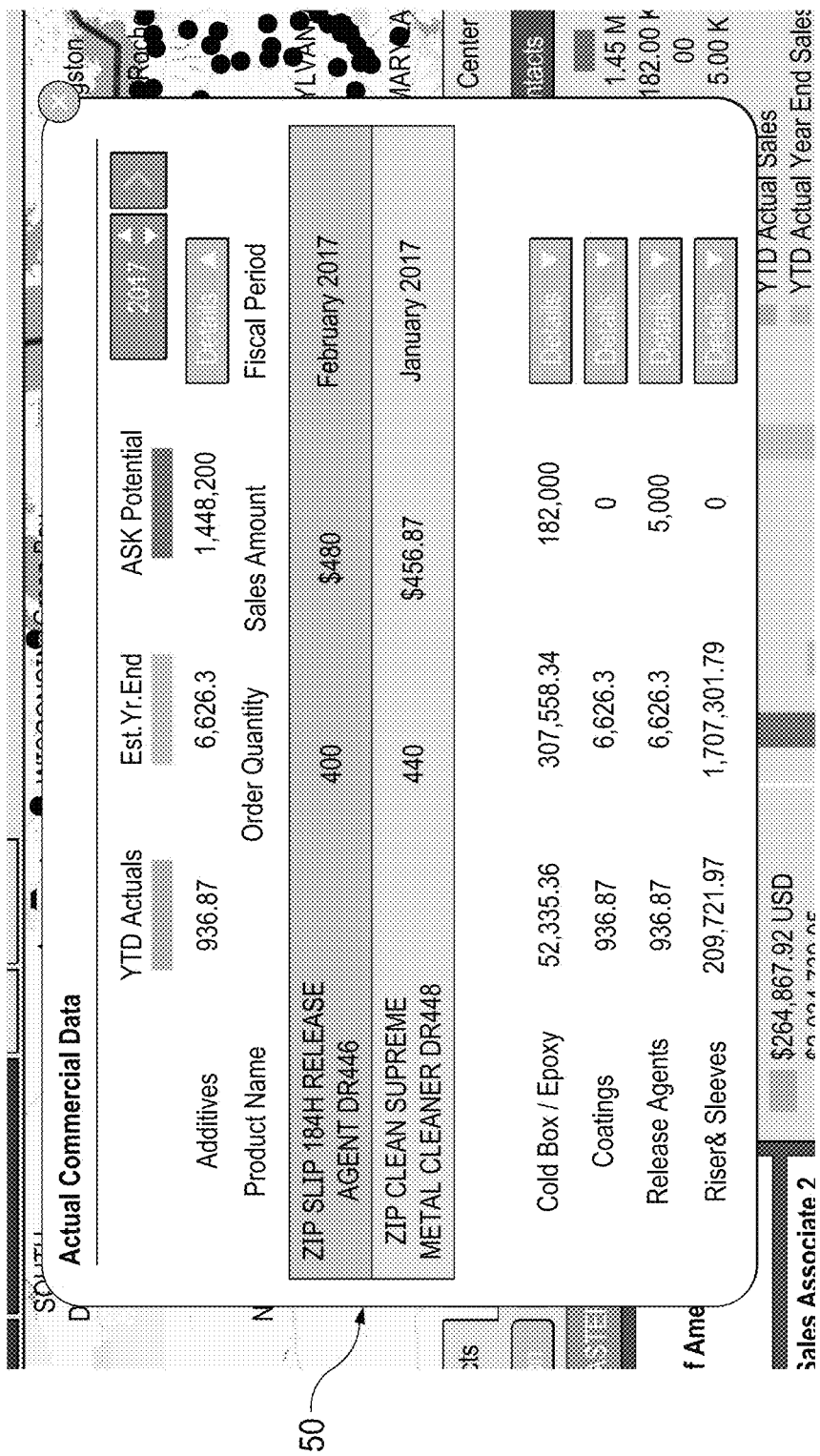
FIG. 8 illustrates one embodiment of another window of the present invention showing detailed sales data for a selected sales target.

In the preferred embodiment, the circle graph is selectable by the user. FIG. 8 illustrates one embodiment of another window of the present invention that is displayed in response to selecting the circle graph (e.g., clicking on it via a mouse device). This window named "actual commercial data" 50 provides more detailed sales data for the selected sales target. For example, this window provides actual, estimated, and potential sales for the selected sales target broken down by product line and by individual products. The user can also view the data over selectable data ranges.

Figure 9:
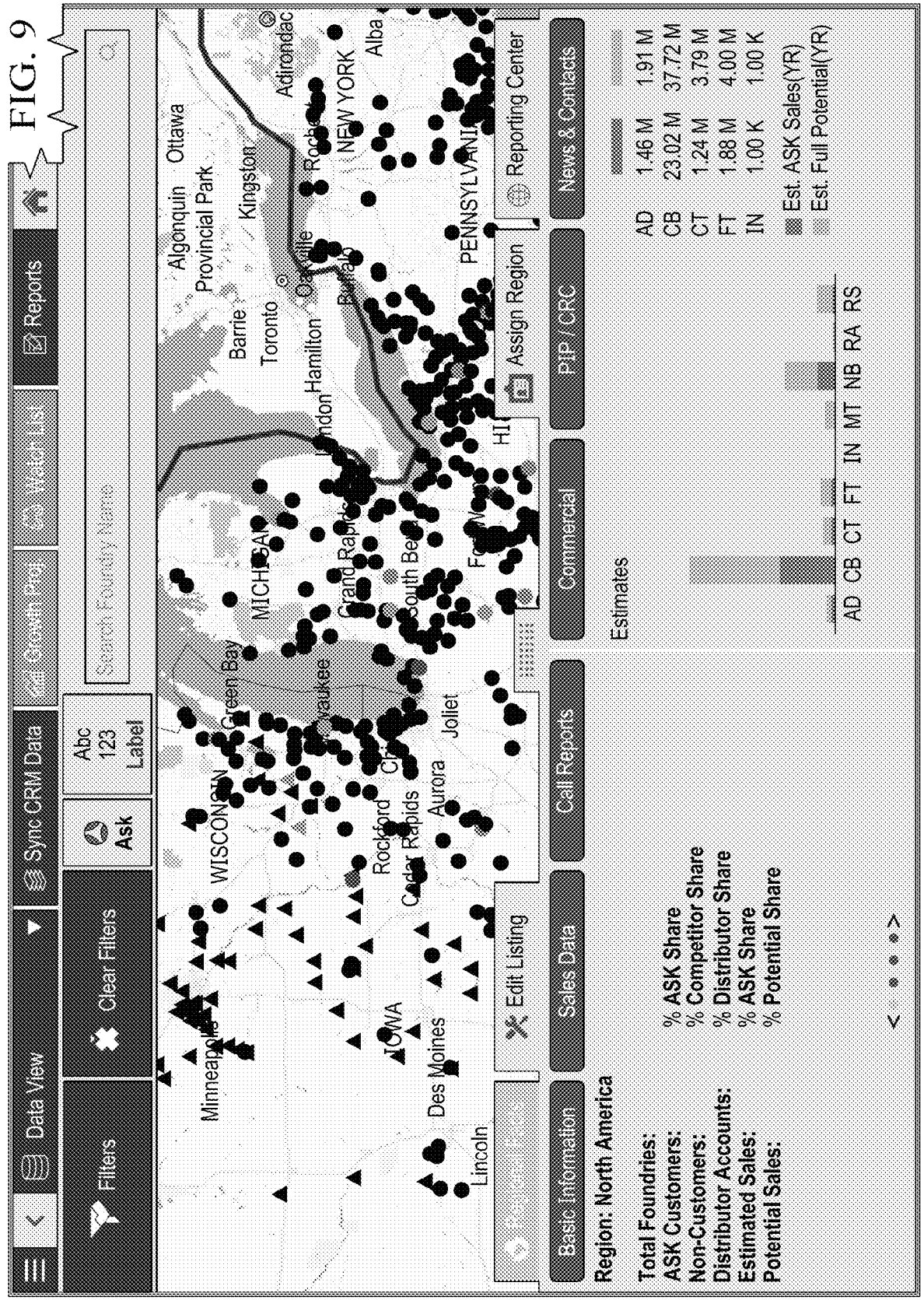
FIG. 9 illustrates one embodiment of the first window of the present invention showing regional information.

FIG. 9 illustrates one embodiment of the first window of the present invention showing regional information. As illustrated, this view provides information relating to the selected region. This view also provides sales data for the selected sales target broken down by product line.

Figure 10:
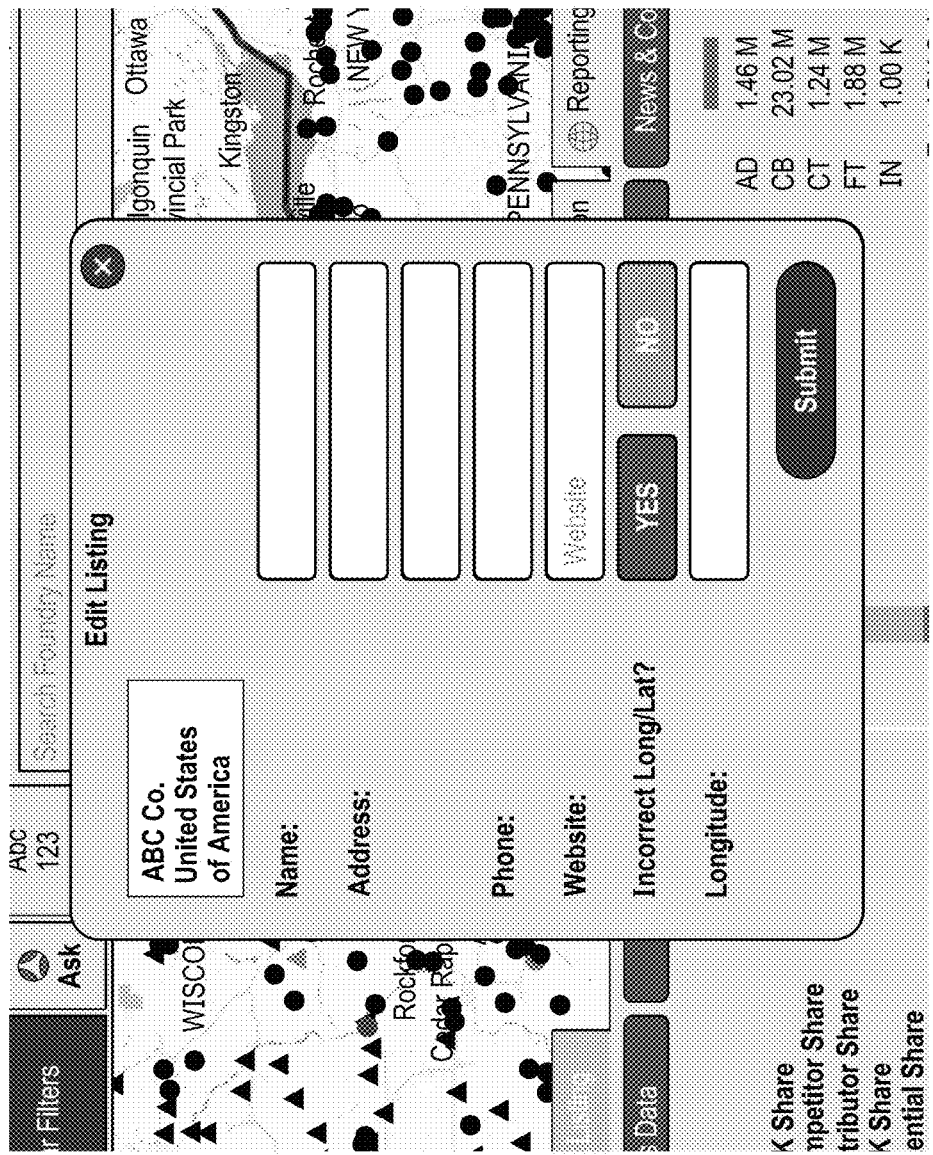
FIG. 10 illustrates one embodiment of the edit listing window of the present invention.
Figure 11:
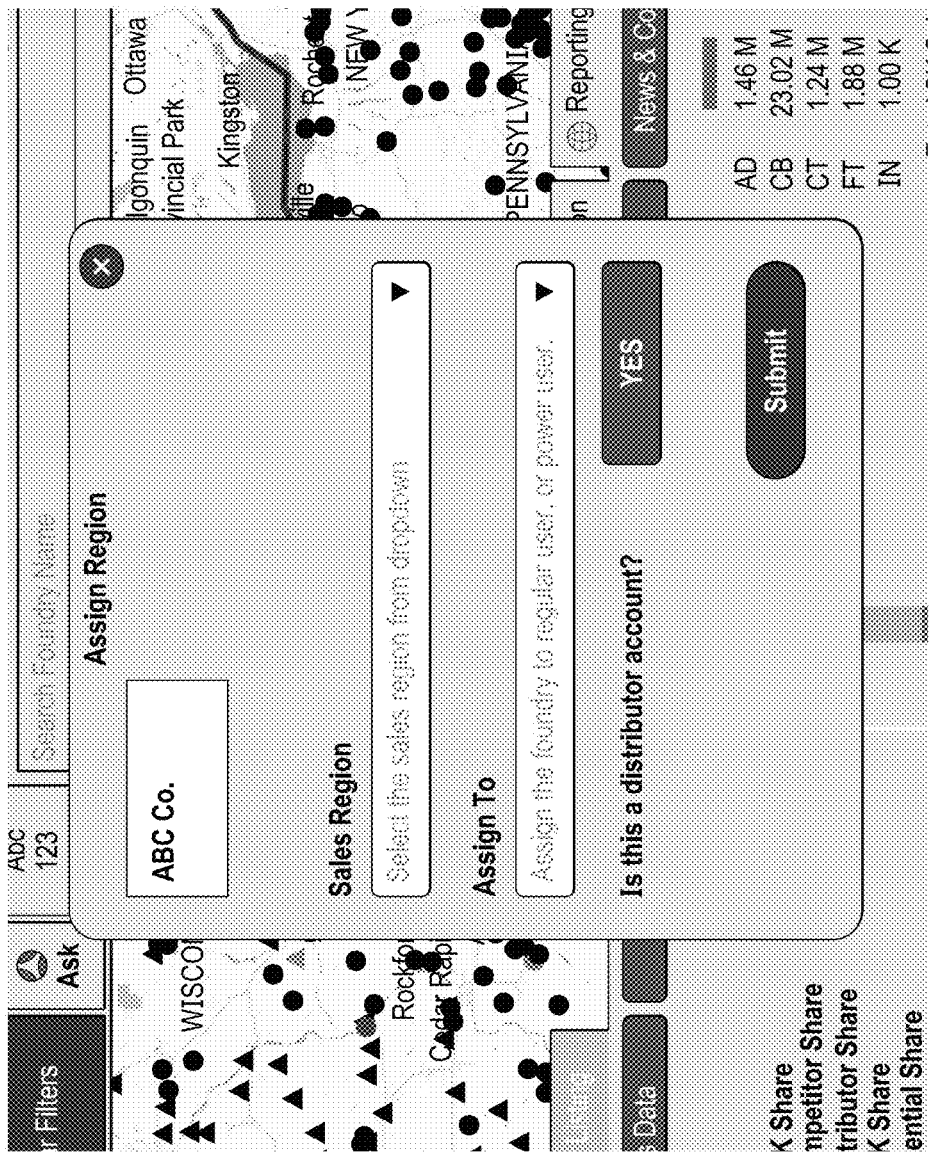
FIG. 11 illustrates one embodiment of the window for assigning sales associates to a particular region.

FIG. 10 illustrates one embodiment of the edit listing window of the present invention. This feature allows authorized users of the system to edit information relating to sales targets. FIG. 11 illustrates one embodiment of the window for assigning sales associates to a particular region.

Figure 12:
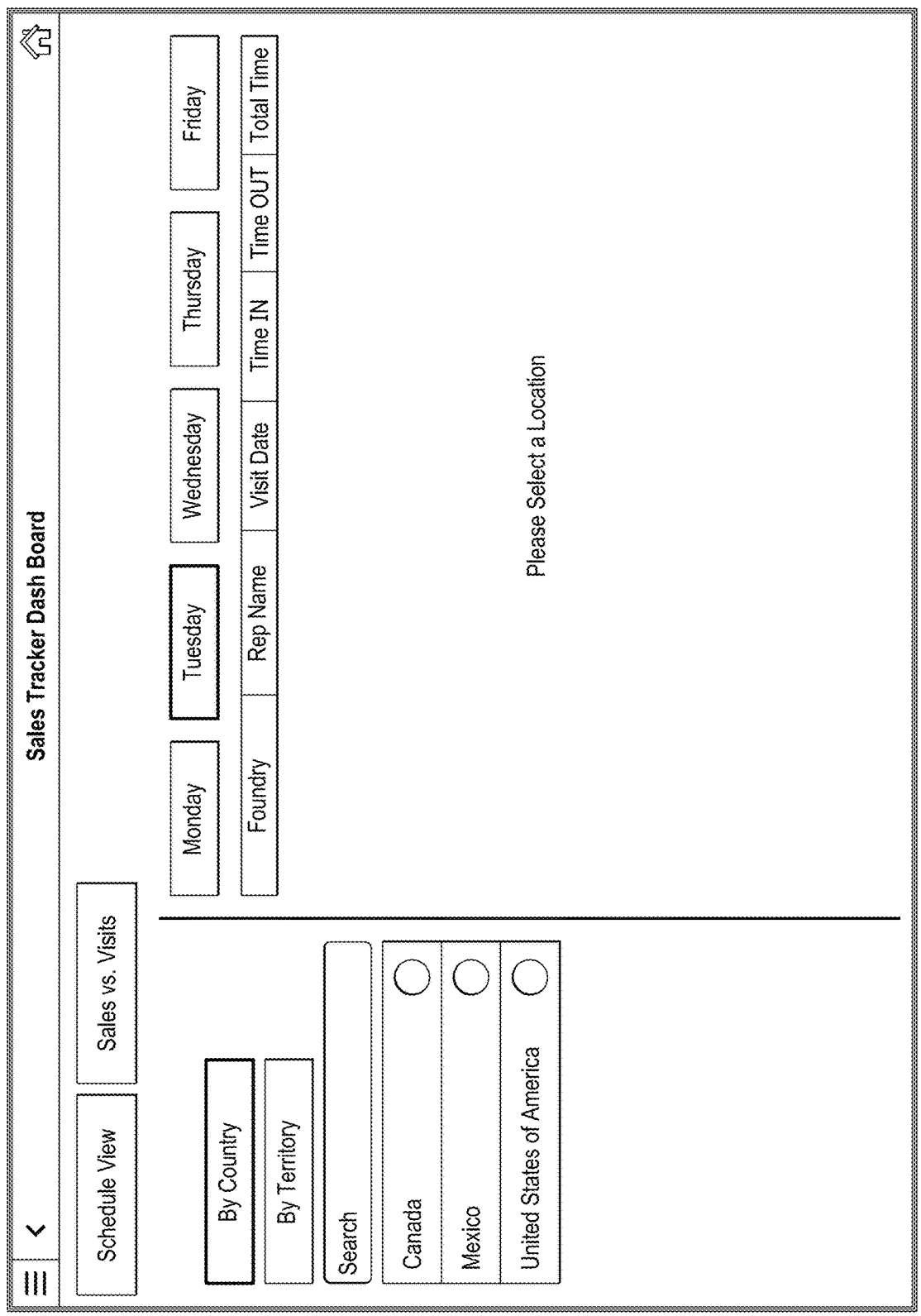
FIG. 12 illustrates one embodiment of the graphical user interface for tracking and displaying sales visit information.

FIG. 12 illustrates one embodiment of the graphical user interface for tracking and displaying sales visit information. As illustrated, sales visits to sales targets can be viewed by country and territory via a schedule view. In this view, sales visit information is displayed and viewed by day.

FIG. 13 illustrates one embodiment of the graphical user interface of FIG. 12 showing a listing of sales visits based on sales targets (in this embodiment, the sales targets are foundries). As illustrated, the system is adapted to list details of all sales visits made to sales targets on a particular day. In this embodiment, the system provides, sales target name, the name of the sales associate who made the visit, the day of the visit, and the time in and out for the visit.

Figure 14:
FIG. 14 illustrates one embodiment of the graphical user interface of FIG. 12 showing a listing of sales visits based on sales associates.

FIG. 14 illustrates one embodiment of the graphical user interface of FIG. 12 showing a listing of sales visits based on sales associates. The system is also adapted to list sales visits based on company sales associates. This view allows the user to view a list of sales visits made by company sales associates for a selected day.

Figure 15:
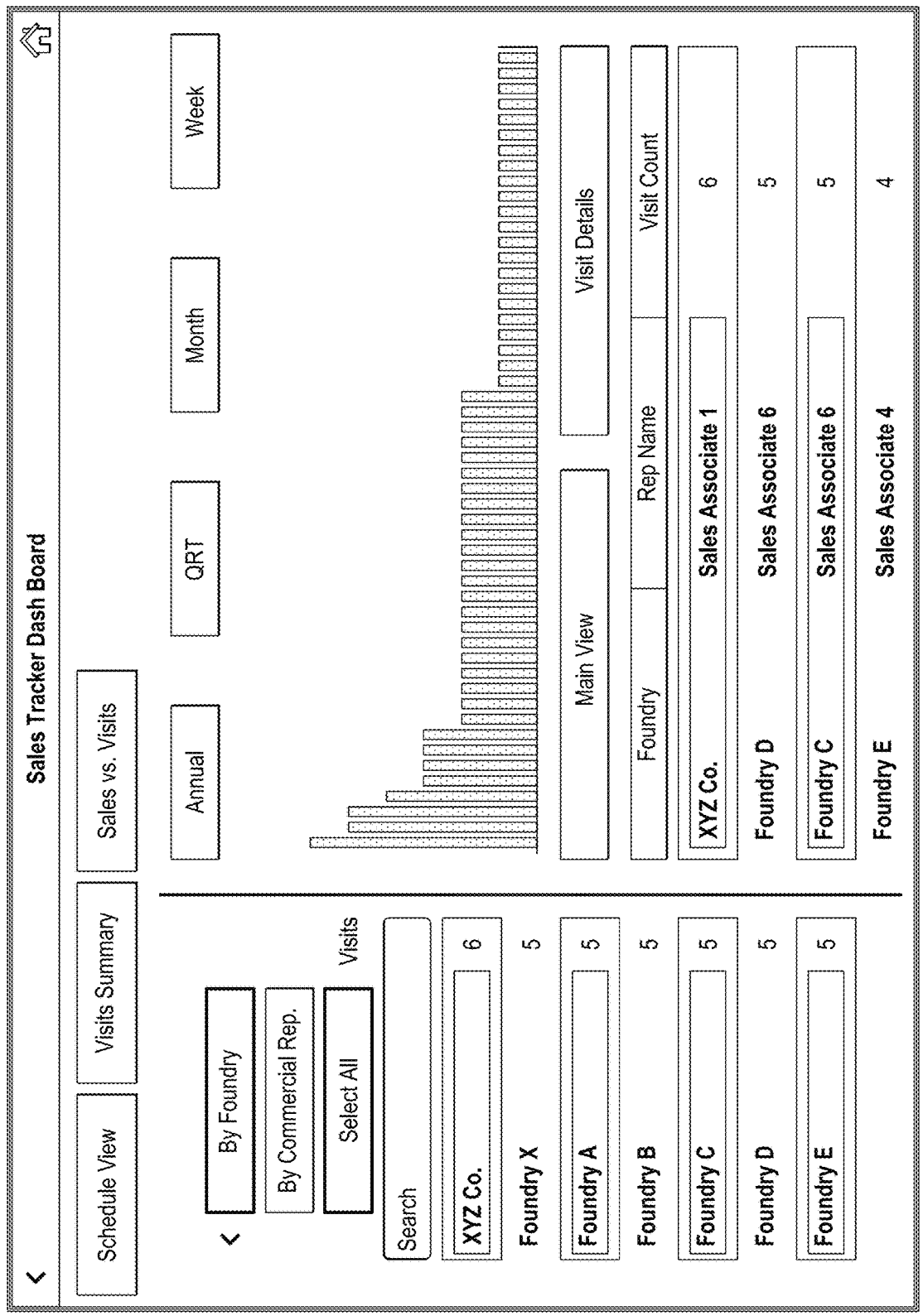
FIG. 15 illustrates one embodiment of the graphical user interface of FIG. 12 showing a graphical view of sales visits for a plurality of sales targets.
Figure 16:
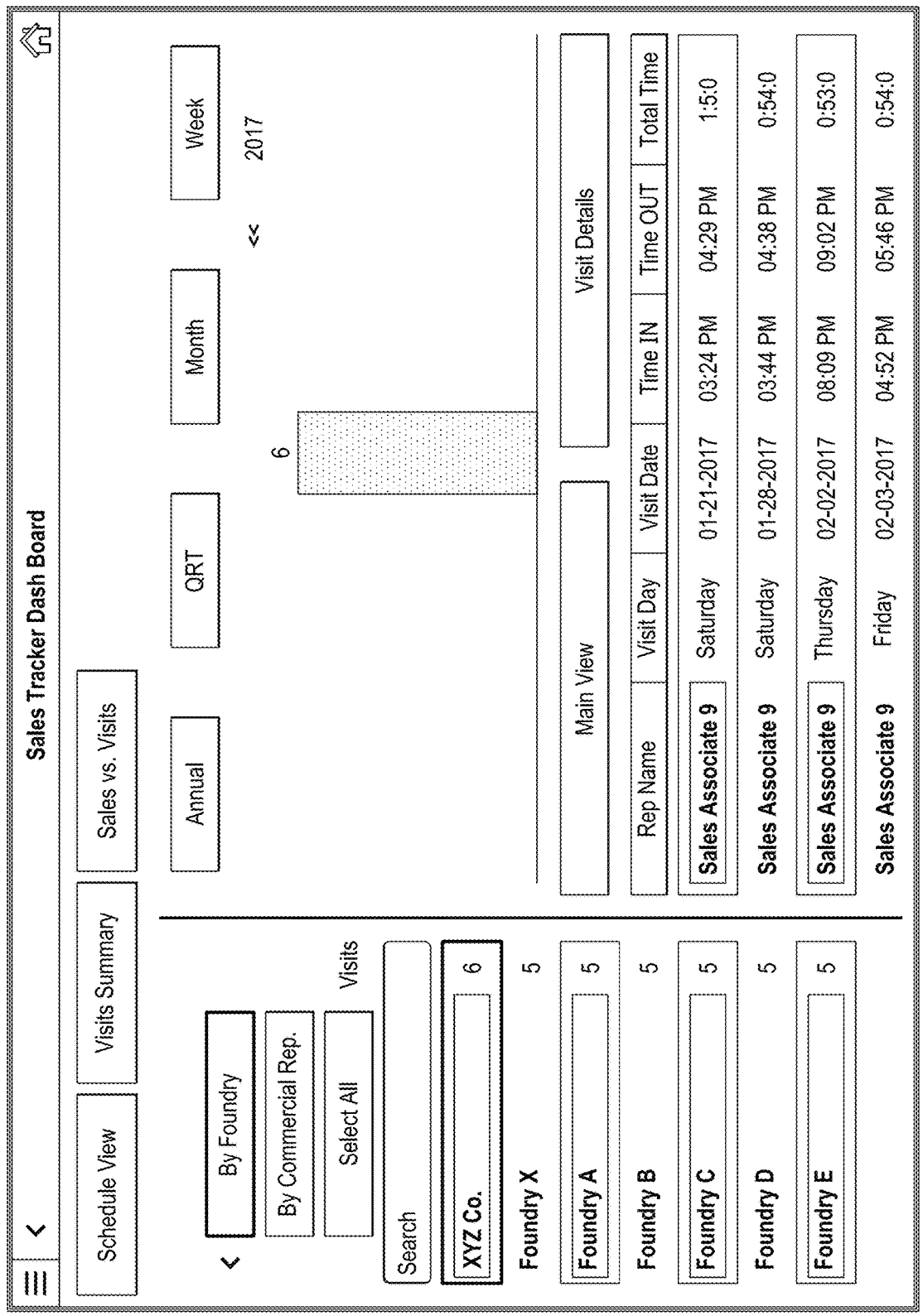
FIG. 16 illustrates one embodiment of the graphical user interface of FIG. 12 showing a graphical view of sales visits for a selected sales target.

FIG. 15 illustrates one embodiment of the graphical user interface of FIG. 12 showing a graphical view of sales visits for a plurality of sales targets. The view provides the number of sales visits made to each of the sales targets for a predetermined period of time (each bar in the graph represents data for a particular sales target and the length of the bar represents the number of visits made to the sales target). For example, the user can view the number of sales visits made to each of the sales targets per year, quarter, month or week. The system is adapted so that the user can select a particular sales target to obtain more detailed information about the sales visits (the sales target can be selected by clicking on the sales target in the left-hand column or by clicking on the bar representing the sales target). FIG. 16 illustrates one embodiment of the graphical user interface of FIG. 12 showing a graphical view of sales visits for a selected sales target (in this embodiment, XYZ Co. is the selected sales target). This view provides detailed information about each sales visit made to this selected sales target.

Figure 17:
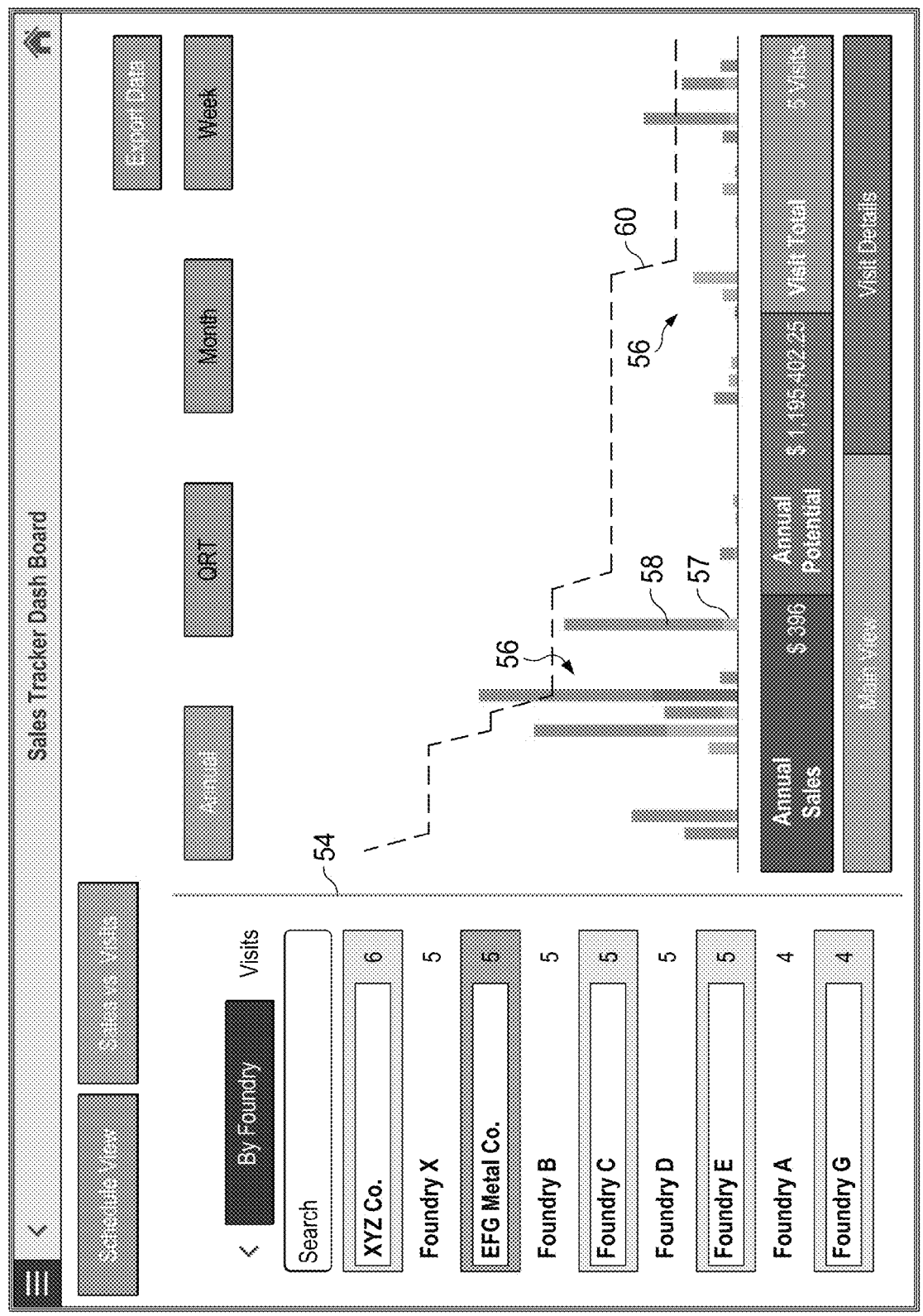
FIG. 17 illustrates one embodiment of the graphical user interface of FIG. 12 showing a graphical view of sales versus sales visits.

FIG. 17 illustrates one embodiment of the graphical user interface of FIG. 12 showing a graphical view of sales versus sales visits. The present invention tracks sales visits to a plurality of sales target locations and facilitates the identification of sales effectiveness by tracking sales versus sales visits. Sales visits to sales target locations are tracked via global positioning devices located in the mobile devices for each of the sales associates. The system stores location information for each of the sales targets and compares this information to the location of each of the sales associates to determine if a sales visit has been made to a sales target.

For example, the GPS devices in the mobile devices for each sales associate transmit location information to the processing system or server of the present invention. The processing system is programmed with instructions for executing on the processing system to: receive the location information sent from the global positioning devices; determine if the mobile devices are within a predetermined distance from one of the plurality of sales target locations; record the number of visits to each of the plurality of sales target locations; and associate one of the sales associates to each of the recorded number of visits (via Identification information sent with the GPS location information).

The system is adapted to display a graph on the graphical user interface, the graph having a first axis 54 for indicating the actual sales amounts for each of the plurality of sales target locations, a plurality of bars 56, each bar associated to one of the plurality of sales target locations. In this embodiment, each of the bars has a first portion 57 for representing the actual sales for each of the plurality of sales target locations for a predetermined time period and a second portion 58 for representing the potential sales for each of the plurality of sales target locations for a predetermined time period. The graph is also comprised of a line 60 perpendicular to the plurality of bars for representing the number of visits to each of the plurality of sales target locations. The system is adapted to dynamically display the plurality of bars and the line representing the number of visits to each of the plurality of sales target locations.

The plurality of bars are selectable, and wherein response to selecting a bar associated with a particular sales target location, the system is adapted to:
a. list the sales visits to the selected sales target location for a predetermined period of time,
b. display in a first region 62 the actual sales to the selected sales target location for a predetermined time period,
c. display in a second region 64 the potential sales to the particular sales target location selected for a predetermined time period.

FIG. 18 illustrates one embodiment of the graphical user interface of FIG. 12 showing sales versus visits for a selected sales target.

Figure 19:
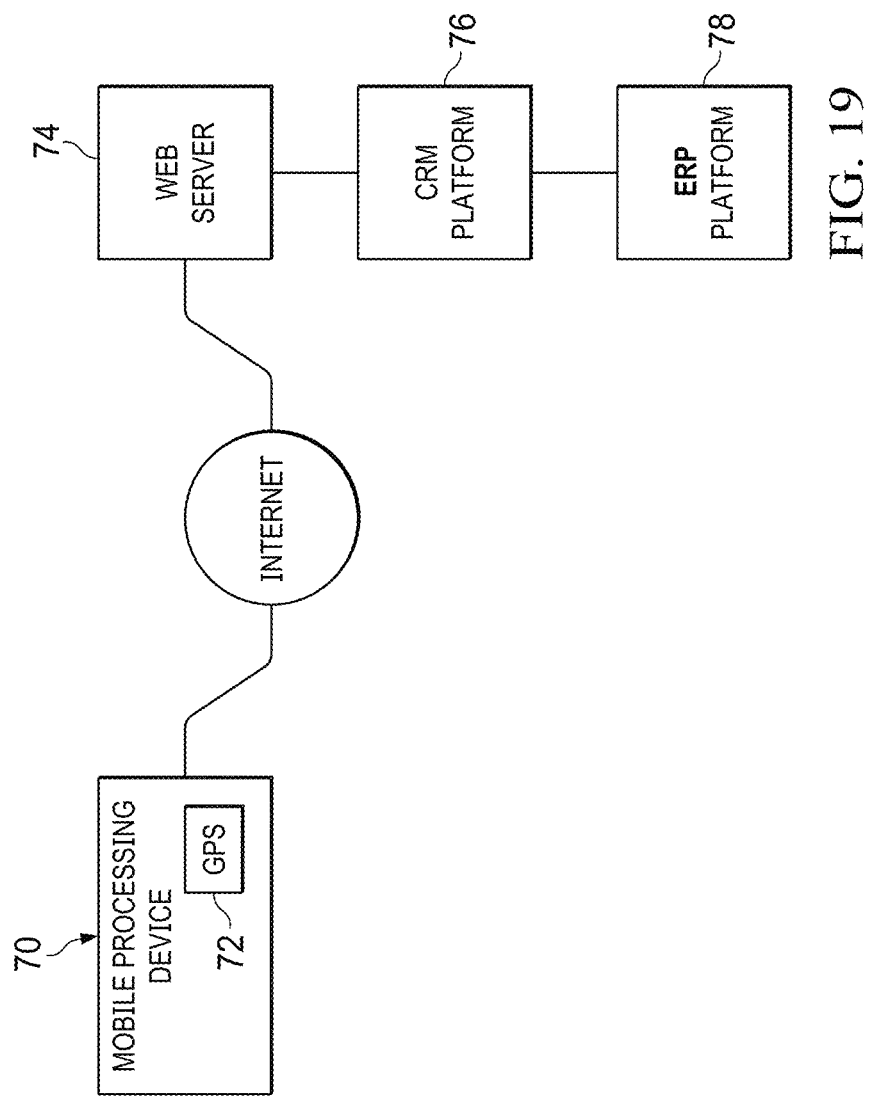
FIG. 19 illustrates a block diagram of one embodiment of the invention.

FIG. 19 illustrates a block diagram of one embodiment of the invention. The present system is comprised of a plurality of mobile processing devices 70, each having a GPS device 72 for sending location information, a Web server 74, a customer relationship management (CRM) platform 76, and an Enterprise Resource Planning (ERP) financial platform 78 for storing financial information.

In this embodiment, each of the sales associates can access the graphical user interface of the present invention on their mobile devices as they travel out in the field. Data can be sent to and from the CRM computing platform through the Internet and a Web server that acts as an intermediary between the mobile devices and the CRM platform. The CRM platform is used to store and process foundry data for use in the system. The CRM platform communicates with the ERP computing platform to obtain actual sales information for each of the sales targets for use in the system. It is understood that the CRM and SAP platforms can be run on a computer network or server system.

While certain embodiments of the present invention are described in detail above, the scope of the invention is not to be considered limited by such disclosure, and modifications are possible without departing from the spirit of the invention as evidenced by the following claims:

What is claimed is:

1. A system for facilitating effective sales, the system comprising:
a database, residing on a server, comprising sales potential data for a plurality of sales targets for a company, where each of the plurality of sales targets is associated with a geographic location, potential revenue information, and sales representative information including information relating to sales representative visits to the plurality of sales targets;
a plurality of mobile devices, each associated with a sales associate and comprising:
an electronic display; and
a location device configured to determine a geographic location of the respective mobile device;
one or more electronic storage devices comprising software instructions,
which when executed by one or more processors, configure the one or more processors to:
receive, over a network by the server, a geographic location of a respective one of the plurality of mobile devices from the location device of the respective mobile device; query the database, by the one or more processors, to identify each of the plurality of sales targets associated with a geographic location within a distance from the determined geographic location of the respective mobile device;
generate a graphical user interface ("GUI") at the electronic display of the respective mobile device comprising a map and selectable icons depicted on the map at positions corresponding with the geographic location of the identified sales targets, wherein the map and selectable icons are displayed in a first region of the GUI;
upon selection of one of the selectable icons, query the database over the network to retrieve the potential revenue information associated with the sales target associated with the selected one of the selectable icons; and
display in a second region of the GUI, a visualization displaying the retrieved potential revenue information of the selected sales target in relation to sales of the selected sales target and display a number of visits associated with the selected sales target over a period of time.

2. The system of claim 1 wherein:
the one or more electronic storage devices and the one or more processors are provided at each of the plurality of mobile devices.

3. The system of claim 1 further comprising:
a remote server, wherein the one or more electronic storage devices and the one or more processors are located at the remote server.

4. The system of claim 1 further comprising:
additional software instructions stored at the one or more electronic storage devices, which when executed by the one or more processors, configures the one or more processors to:
receive data from the respective mobile device indicating a visit to the sales target associated with the selected one of the selectable icons; and
update the database to indicate the visit to the sales target by the sales associate associated with the respective mobile device.

5. The system of claim 4 further comprising:
additional software instructions stored at the one or more electronic storage devices, which when executed by the one or more processors, configures the one or more processors to:
receive date and time information from a time keeping device associated with the mobile device; and
update the database to indicate the time and date of the visit to the sales target.

6. The system of claim 1 wherein:
the visual representation comprises a graph comprising a first portion indicating the potential revenue information associated with the sales target associated with the selected one of the selectable icons, and a second portion indicating the sales of the representative company.

7. The system of claim 1 wherein:
the database comprises sales target information associated with each of the sales targets; and
said sales target information comprises company identity information and assigned sales representative information.

8. The system of claim 7 further comprising:
additional software instructions stored at the one or more electronic storage devices, which when executed by the one or more processors, configures the one or more processors to, upon selection of one of the selectable icons:
retrieve from the database the sales target information associated with the sales target associated with the selected one of the selectable icons; and
display the retrieved sales target information at the GUI for the respective mobile device.

9. The system of claim 1 further comprising:
additional software instructions stored at the one or more electronic storage devices, which when executed by the one or more processors, configures the one or more processors to generate a second visualization at the GUI for the respective mobile device, where the second visualization comprises a plurality of bars, each associated with one of the sales targets within the distance from the determined geographic location of the respective mobile device, each bar having a first portion indicating the potential revenue information associated with the respective sales target and a second portion indicating the sales of the representative company to the respective sales target.

10. The system of claim 4, further comprising:
additional software instructions stored at the one or more electronic storage devices, which when executed by the one or more processors, configures the one or more processors to:
generate a second visualization comprising a list of the visits to the sales target associated with the selected one of the selectable icons for a period of time.

11. A method for facilitating effective sales, the method comprising the steps of:
providing a database, residing on a server, comprising sales potential data for a plurality of sales targets for a company, where each of the plurality of sales targets is associated with a geographic location, potential revenue information, and sales representative information including information relating to sales representative visits to the plurality of sales targets;
receiving, over a network by the server, a geographic location from a mobile device having a location device;
querying the database, by one or more processors, to identify each of the plurality of sales targets associated with a geographic location within a distance from the received geographic location of the mobile device;
generating a graphical user interface ("GUI") at an electronic display for the mobile device, said GUI comprising a map and one or more selectable icons depicted on the map at positions corresponding with the geographic locations of each of the identified sales targets, wherein the map and selectable icons are displayed in a first region of the GUI;

upon selection of one of the selectable icons on the GUI:
querying the database, by the one or more processors, to retrieve the potential revenue information associated with the sales target associated with the selected one of the selectable icons; [[and]]

generating, in a second region of the GUI, a visualization of the retrieved potential revenue information of the selected sales target in relation to sales of the selected sales target; and displaying a number of visits associated with the selected sales target over a period of time.

12. The method of claim 11 further comprising the steps of:
generating a second visualization at the GUI comprising a plurality of bars, wherein each of said plurality of bars is associated with one of the sales targets associated with one of the selectable icon displayed at the map, wherein each of said plurality of bars comprises a first portion indicating the potential revenue information associated with the respective sales target and a second portion indicating the sales of the representative company to the respective sales target.

13. The method of claim 12 further comprising the steps of:
receiving user input from the mobile device indicating a visit to the sales target associated with one of the selectable icons displayed at the map; and
updating the database to indicate the visit to the sales target by the sales associate associated with the mobile device from which said user input was received.

14. The method of claim 11 wherein:
the database comprises additional sales target information with each of the sales targets; and
said additional sales target information comprises company identity information and assigned sales representative information.

15. The method of claim 14 further comprising:
retrieving from the database the additional sales target information associated with the sales target associated with the selected one of the selectable icons; and
displaying the retrieved additional sales target information at the GUI for the mobile device.

16. A system for facilitating effective sales, the system comprising:
a database comprising sales potential data for each of the plurality of sales targets for a company, where each of the plurality of sales targets is associated with a geographic location, potential revenue information, and sales representative information including information relating to sales representative visits to the plurality of sales targets;
a mobile device associated with a sales associate and comprising:
an electronic display; and
a location device configured to determine a geographic location of the mobile device; and
a server in electronic communication with the mobile device and comprising software instructions, which when executed configure the server to:
receive, over a network by the server, a geographic location from the mobile device;
query the database, by the server, to identify each of the plurality of sales targets associated with a geographic location within a predetermined distance from the received geographic location;
generate a graphical user interface ("GUI") at the electronic display comprising a map and selectable icons depicted on the map at positions corresponding with the geographic location of each of the identified sales targets, wherein the map and selectable icons are displayed in a first region of the GUI;
monitor for user input at the GUI indicating selection of one of the selectable icons;
upon selection of one of the selectable icons: retrieve, from the database, the potential revenue information associated with the sales target associated with the selected one of the selectable icons; and
display in a second region of the GUI, a visualization of the potential revenue information of the selected sales target in relation to sales of the selected sales target and display a number of visits associated with the selected sales target over a period of time.

* * * * *